(12) United States Patent
Aizawa et al.

(10) Patent No.: US 8,788,132 B2
(45) Date of Patent: Jul. 22, 2014

(54) CONTROL DEVICE AND CONTROL METHOD FOR HYBRID VEHICLE

(75) Inventors: Takeo Aizawa, Hachioji (JP); Kakuzou Kaneko, Ebina (JP); Hirotaka Koyama, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/880,458

(22) PCT Filed: Oct. 6, 2011

(86) PCT No.: PCT/JP2011/073092
§ 371 (c)(1),
(2), (4) Date: Apr. 19, 2013

(87) PCT Pub. No.: WO2012/056862
PCT Pub. Date: May 3, 2012

(65) Prior Publication Data
US 2013/0218391 A1    Aug. 22, 2013

(30) Foreign Application Priority Data

Oct. 27, 2010 (JP) ................. 2010-240379

(51) Int. Cl.
| | | |
|---|---|---|
| *B60W 20/00* | (2006.01) | |
| *B60W 10/06* | (2006.01) | |
| *B60W 10/08* | (2006.01) | |
| *B60L 3/00* | (2006.01) | |
| *B60L 15/20* | (2006.01) | |
| *B60W 10/02* | (2006.01) | |
| *B60L 11/14* | (2006.01) | |
| *B60K 6/48* | (2007.10) | |
| *B60L 7/14* | (2006.01) | |

(52) U.S. Cl.
CPC .............. *B60W 20/40* (2013.01); *B60L 3/0023* (2013.01); *B60W 20/50* (2013.01); *B60L 2240/423* (2013.01); *B60L 15/2009* (2013.01); *B60L 2240/443* (2013.01); *B60W 10/02* (2013.01); *B60L 2240/421* (2013.01); *Y10S 903/93* (2013.01); *B60L 2240/441* (2013.01); *B60L 2220/14* (2013.01); *B60L 2240/486* (2013.01); *Y02T 10/642* (2013.01); *Y02T 10/7077* (2013.01); *B60L 2270/145* (2013.01); *Y02T 10/6286* (2013.01); *B60L 11/14* (2013.01); *Y02T 10/7241* (2013.01); *B60W 10/06* (2013.01); *B60L 2240/12* (2013.01); *B60L 2210/40* (2013.01); *B60L 2240/507* (2013.01); *B60W 10/08* (2013.01); *B60K 6/48* (2013.01); *Y02T 10/6221* (2013.01); *B60L 7/14* (2013.01); *B60L 2240/445* (2013.01)
USPC .................. 701/22; 903/930; 180/65.28

(58) Field of Classification Search
CPC ..... B60W 10/06; B60W 20/40; B60W 10/04; B60W 20/00; B60W 20/50
USPC .................. 701/22; 903/930; 180/65.28
See application file for complete search history.

(56) References Cited

FOREIGN PATENT DOCUMENTS

JP        2007 331599 A   * 12/2007  ............... B60K 6/48

*Primary Examiner* — Mary Cheung
*Assistant Examiner* — Brian P Sweeney
(74) *Attorney, Agent, or Firm* — Young Basile

(57) ABSTRACT

A control system for a hybrid vehicle is provided with an abnormality detection unit, a start determination unit, and a start control unit. The abnormality detection unit detects abnormality in at least one of an engine, a first clutch, and an automatic transmission. The start determination unit determines whether or not to allow the engine to be started, and the start control unit controls to start the engine. If an abnormality has been detected by the abnormality detection unit, the start determination unit inhibits the start control unit from starting the engine, and maintains the inhibition even when the abnormality has been eliminated, when the accelerator pedal opening is larger than a predetermined value.

6 Claims, 8 Drawing Sheets

FIG. 5

|  | B1 Fr/B | C1 I/C | C2 D/C | C3 H&LR | B2 LOW | B3 2346 | B4 R/B | F1 | F2 |
|---|---|---|---|---|---|---|---|---|---|
| 1st | (O) |  |  | (O) | O |  |  | O | O |
| 2nd |  |  |  | (O) | O | O |  | O | O |
| 3rd |  |  | O |  | O | O |  |  |  |
| 4th |  |  | O | O |  | O |  |  |  |
| 5th |  | O | O | O |  |  |  |  |  |
| 6th | O | O |  | O |  | O |  |  |  |
| 7th | O |  |  | O |  |  |  | O |  |
| Rev. | O |  |  | O |  |  | O |  |  |

CONTROL DEVICE AND CONTROL METHOD FOR HYBRID VEHICLE

TECHNICAL FIELD

The present invention relates to a control system and a control method for a hybrid vehicle having an internal combustion engine and a motor/generator as a power source.

BACKGROUND

A hybrid vehicle is known provided with two types of power sources, i.e., an electric motor and an engine, an electric generator to generate electricity primarily by the output of the engine and a power splitting mechanism to separate the engine output into a driving force to driving wheels of the vehicle and driving force for generation of electricity (see Japanese Laid-Open Patent Application Publication No. 2007-55291, for example).

In this conventional hybrid vehicle, during running or travel of the vehicle using only the motor, when there is a request for starting the engine, the engine will be started by transmitting driving force from the driving wheels of the vehicle to the engine through the power splitting device to thereby start the engine so that the vehicle travels by the driving forces from both the engine and the motor at high load operation.

BRIEF SUMMARY

In the hybrid vehicle described above, due to failure or protection of the engine or the like, the vehicle may be forced to run on a motor drive mode temporarily. In this case such as like this, since the power source originates from the motor only accompanied with a temporarily decrease in driving force than normal, the driver may depress the accelerator pedal more strongly than usual. Consequently, upon resolution or elimination of the engine failure or the like, when the driving force of the engine is restored or recovered, a problem has been encountered in which the driver has an uncomfortable feeling.

The object the present invention is to solve is to provide a control system and control method for a hybrid vehicle that may reduce the uncomfortable feeling to the driver.

The present invention solves the above problem by maintaining to prohibit the engine from being started even when the abnormality has been resolved or eliminated associated with at least one of an internal combustion engine, the friction engagement element, or the transmission, when an accelerator opening is equal to or greater than a predetermined opening.

According to the present invention, in a situation in which the accelerator opening is equal to or greater than a predetermined opening, even upon elimination of the abnormality associated with engine, friction engagement element, and transmission, the inhibition of start of the internal combustion engine is maintained. Thus, upon elimination of abnormality of the engine and the like at an accelerator opening being large, driving force of the engine will not be added so that the uncomfortable feeling to the driver may be alleviated.

BRIEF DESCRIPTION OF THE DRAWINGS

The description herein makes reference to the accompanying drawings wherein like reference numerals refer to like parts throughout the several views, and wherein:

FIG. 5 is a diagram showing a shifting map of the automatic transmission of the hybrid vehicle shown in FIG. 4.

DETAILED DESCRIPTION

The embodiments according to the present invention are now described with reference to the drawings.

Figure 1:
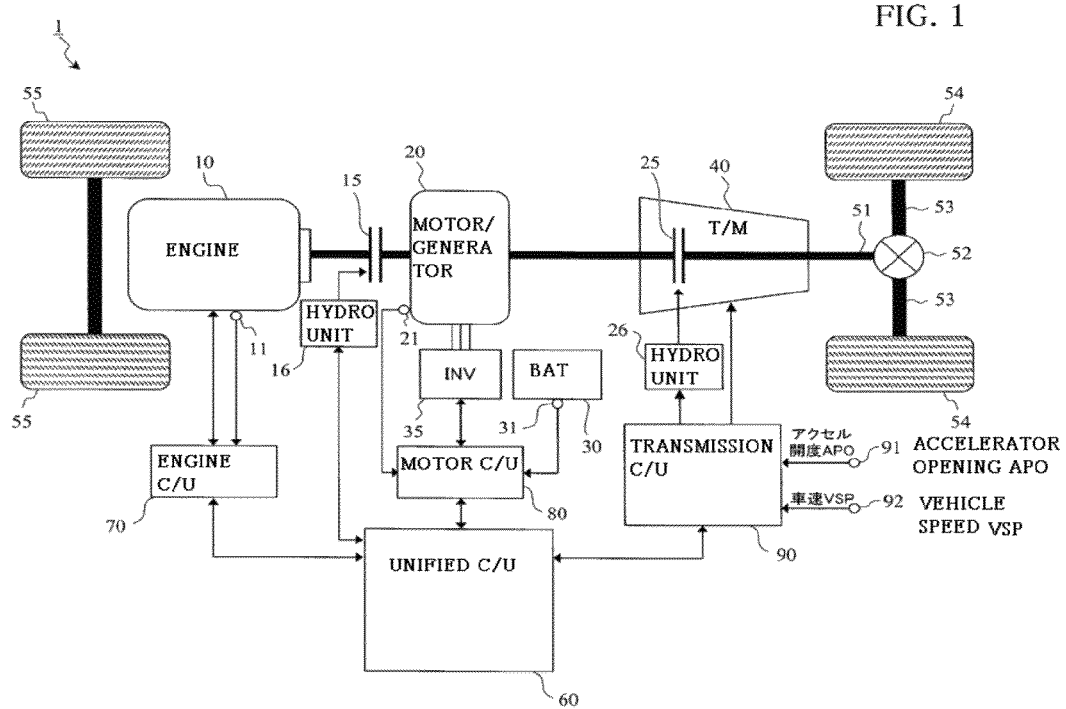
FIG. 1 is a block diagram showing an overall configuration of a hybrid vehicle in an embodiment according to the present invention.

The hybrid vehicle 1 of the embodiment according to the present invention is a vehicle of parallel system using a plurality of power sources for propulsion of the vehicle. As shown in FIG. 1, the hybrid vehicle 1 is provided with an internal combustion engine 10 (hereinafter referred to as "engine"), first clutch 15, motor/generator 20 (motor, generator), second clutch 25, battery 30, inverter 35, automatic transmission 40, propeller shaft 51, differential gear unit 52, drive shaft 53, and left and right driving wheels 54.

The engine 10 is an internal combustion engine driven by gasoline, light oil, etc., and a valve openness of throttle valve, fuel injection amount, ignition timing, etc. are controlled based on a control signal from the engine control unit 70.

This engine 10 is provided with an engine rotation speed sensor 11 to detect engine rotation speed Ne.

The first clutch 15 is interposed between the output shaft of the engine 10 and the rotating shaft of the motor/generator 20, and is thus selectively connected and disconnected for torque transmission between engine 10 and motor/generator 20. As an example of first clutch 15, a multiple-plate wet clutch may be enumerated for continuously controlling the hydraulic flow rate and hydraulic pressure by way of a linear solenoid.

In the first clutch 15, a hydraulic pressure of hydraulic unit 16 is controlled and applied based on the control signal from unified or integrated control unit 60, and clutch plates will be engaged or released (including engagement under a slipped state).

The motor/generator 20 is a synchronous type motor/generator in which permanent magnets are embedded in a rotor and stator coils are wound around the stator. This motor/ generator 20 is provided with a motor rotation speed sensor 21. This motor/generator 20 functions both as an electric motor as an electricity generator. When supplied with a three phase alternate power from inverter 35, motor/generator 20 is driven to rotate (drive mode).

On the other hand, when rotor rotates by external force, motor/generator 20 produces the AC power by causing electromotive force at both ends of the stator coils (regeneration). The AC power generated by the motor generator 20 is charged to the battery 30 after being converted to direct current by the inverter 35.

An example of battery 30 is a lithium ion secondary battery or nickel-hydrogen secondary battery. A current-voltage sensor 31 is attached to the battery 30, and these detection outputs are output to the motor control unit 80.

The second clutch 25 is interposed between motor/generator 20 and left and right drive wheels 54 to selectively connect and disconnect the power transmission between motor/generator 20 and drive wheels 54. Similar to the first clutch 15 described above, the second clutch 25 may be formed by a dry, multiple-plate clutch and the like. The second clutch 25 controls the hydraulic pressure of the hydraulic unit 26 in response to a control signal from the transmission control unit 90 to thereby selectively connect and disconnect the clutch plates (including a slipped state thereof).

The automatic transmission 40 has a multiple-step transmission with speed ratios such as seven forward and one reverse speed ratios, which is subject to switch or change automatically depending on vehicle speed, accelerator opening, etc. This automatic transmission 40 may change speed ratios in accordance with control signal from the unified or integrated control unit 60. The second clutch 25 is not necessarily added as a separate, dedicated element as shown in FIG. 1. Rather, various friction elements selected from a plurality of friction engagement elements within the automatic transmission 40, that are to be engaged at each transmission step may be utilized.

Figure 2:
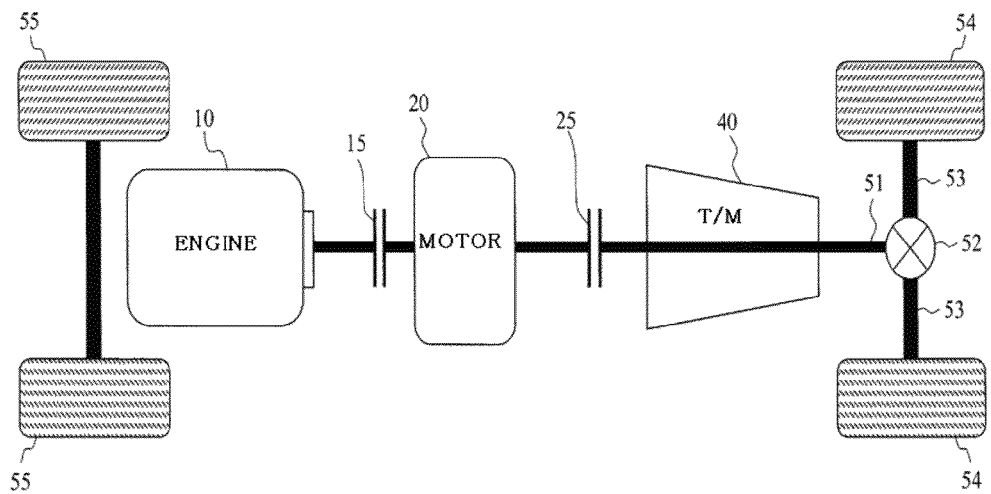
FIG. 2 is a diagram showing a power train of a hybrid vehicle of another embodiment according to the present invention.

However, the arrangement is not limited to this configuration. For example, as illustrated in FIG. 2, the second clutch may be interposed between output shaft of motor/generator 20 and input shaft of automatic transmission. Alternatively, as shown in FIG. 3, the second clutch 25 may be configured to be arranged between the output shaft of automatic transmission 40 and propeller shaft 52.

Figure 3:
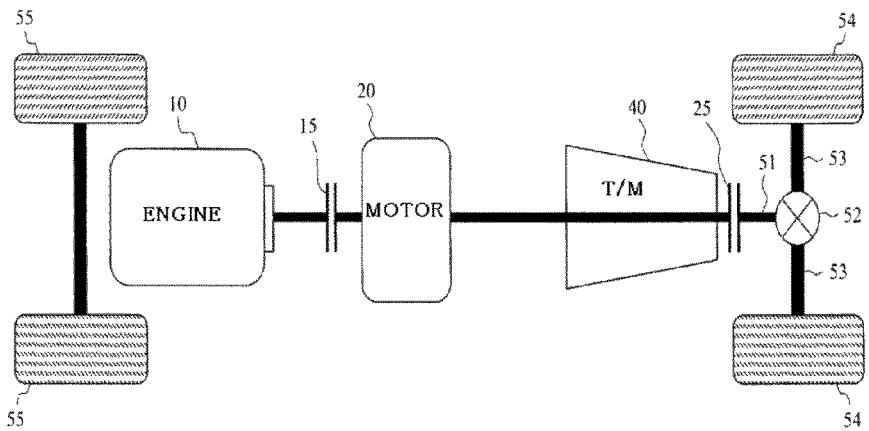
FIG. 3 is a diagram showing a power train of a hybrid vehicle of yet another embodiment according to the present invention.

In FIGS. 2 and 3, a configuration of hybrid vehicle in the other embodiments is shown. The components other than the power train are the same as those in FIG. 1 so that only the configuration related to the powertrains is shown.

Figure 4:
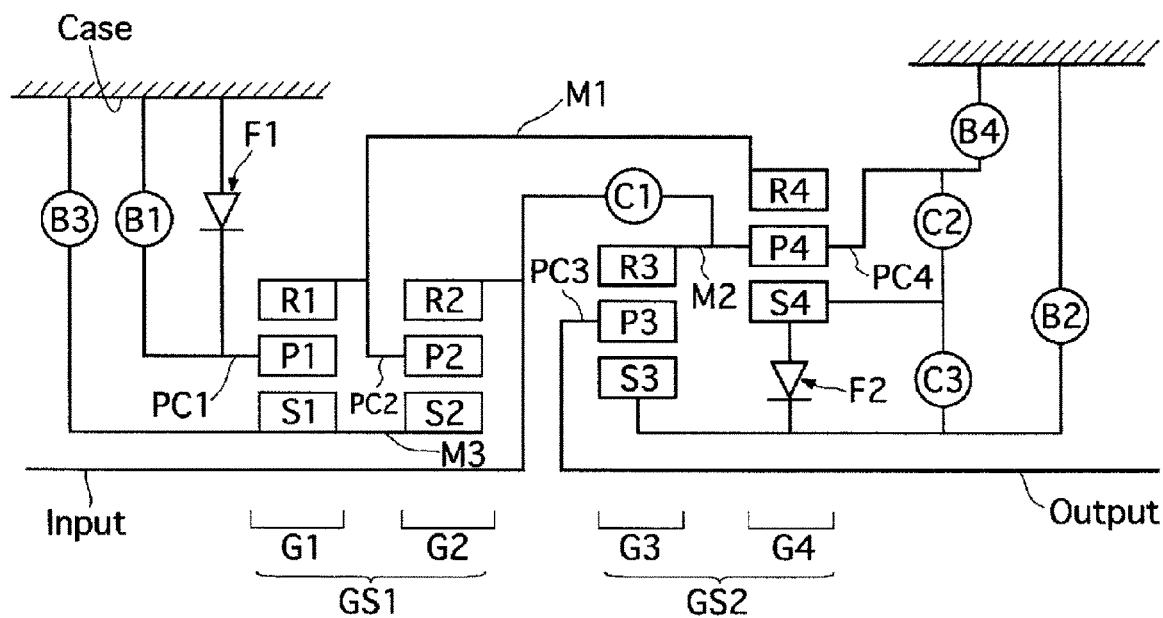
FIG. 4 is a skeleton diagram showing the configuration of the automatic transmission in an embodiment according to the present invention.

FIG. 4 is a skeleton diagram showing the configuration of the automatic transmission 40. The automatic transmission 40 is provided with a first planetary gear set GS1 (first planetary gear G1, second planetary gear G2) and a second planetary gear set GS2 (third planetary gear G3, a fourth planetary gear G4). Note that these first planetary gear set GS1 (first planetary gear G1, second planetary gear G2) and second planetary gear set GS2 (third planetary gear G3, a fourth planetary gear G4) are disposed in this order with respect to the side of input shaft toward the side of axial output shaft, Output.

In addition, the automatic transmission 40 is provided with a plurality of clutches C1, C2 and C3, a plurality of brakes B1, B2, B3 and B4, and a plurality of one-way clutches F1, F2.

The first planetary gear G1 is a single pinion type planetary gear having a first sun gear S1, first ring gear R1, and a first carrier PC1 supporting a first pinion P1 intermeshed with these gears S1, R1.

The second planetary gear G2 is a single pinion type planetary gear having a second sun gear S2, second ring gear R2, and a second carrier PC2 supporting second pinion P2 intermeshed with these gears S2, R2.

The third planetary gear G3 is a single pinion type planetary gear having a third sun gear S3, third ring gear R3, and a third carrier PC3 supporting third pinion P3 intermeshed with these gears S3, R3.

Further, the fourth planetary gear G4 is a single pinion type planetary gear having a fourth sun gear S4, fourth ring gear R4, and a fourth carrier PC4 supporting fourth pinion P4 intermeshed with these gears S4, R4.

The input shaft, Input, Is connected to the second ring gear R2, and receives a rotational drive force from engine 10 or motor/generator 20. The output shaft, Output, is connected to the third carrier PC3 and transmits the rotational drive force output to drive wheels 54 through a final gear (not shown).

A first connecting member M1 is a member integrally connected to the first ring gear R1, second carrier PC2, and fourth ring gear R4. A second connecting member M2 is a member integrally connected to the third ring gear R3 and fourth carrier PC4. A third connecting member M3 is a member integrally connected to the first sun gear S1 and second sun gear S2.

The first planetary gear set GS1 is structured by connecting the first planetary gear G1 and second planetary gear G2 via the first connecting member M1 and third connecting member M3 to be composed of four rotation elements.

The second planetary gear set GS2 is structured by connecting the third planetary gear G3 and fourth planetary gear G4 via the second connecting member M2 to be composed of five rotation elements.

The first planetary gear set GS1 has a torque input path extending from input shaft, Input, to input to the second ring gear R2. The torque input to the first planetary gear set GS1 is output from the first connecting member M1 to the second planetary gear set GS2.

The second planetary gear set GS2 has a torque input path extending from input shaft Input to input to the second connecting member M2 as well as a torque path extending from the first connecting member M1 to fourth ring gear R4. The torque input to the second planetary gear set GS2 will be output from the third carrier PC3 to output shaft, Output.

Note that, when H&LR clutch C3 is released and rotation speed of forth sun gear S4 is greater than that of first sun gear S3, third sun gear S3 and forth sun gear S4 produce impendent rotation speeds. Thus, such a configuration is obtained in which the third planetary gear G3 is connected with fourth planetary gear G4 via second connecting member M2, so that individual planetary gears attain gear ratios mutually independent.

Further, the input clutch C1 is a clutch selectively connecting and disconnecting the input shaft, Input, and the second connecting member M2. The direct clutch C2 selectively connects and disconnects the fourth sun gear S4 and fourth carrier PC4. H&LR clutch C3 selectively connects the third sun gear S3 and fourth sun gear S4. Note that a second one-way clutch is interposed between the third sun gear S3 and fourth sun gear S4.

Front brake B1 selectively stops rotation of first carrier PC1. In addition, first one-way clutch F1 is disposed parallel to front brake B1. Low brake B2 selectively stops third sun gear S3.

2346 Brake selectively stops rotation of the third connecting member M3 (first sun gear S1 and second sun gear S2). Reverse brake B4 selectively stops rotation of fourth carrier PC4.

FIG. 5 is a diagram showing an engagement operation table for automatic transmission 40 with seven forward and one reverse speeds. The "o" in FIG. 5 shows a state in which relevant clutch or brake is in an engaged state, while blank cell shows a state in which the brake or clutch is in a released state. The circle "(o)" in FIG. 5 indicates an engagement during the operation of engine brake only. Note that, as described above, in the present embodiment, the friction engagement element in the automatic transmission 40 is utilized as second clutch 25, and the friction engagement elements encircled by a bold line in FIG. 5 are configured to function as second clutch 25. Specifically, during the first to third speed ratios, Low brake B2 is used for second clutch 25 while for the fourth to seventh speed ratios, H&LR clutch C3 will be used for the second clutch 25.

Note that the transmission is not limited to the seven-speed, one-reverse step transmission described above. For example, the five-speed, one-reverse step transmission disclosed in the Japanese Laid-Open Patent Application Publication No. 2007-314097 may be used for the automatic transmission 40.

Referring back to FIG. 1, the output shaft of automatic transmission 40 is connected to left and right drive wheels via propeller shaft 51, differential gear unit 52, and left and right drive shaft 53. The left and right front wheels are steerable and indicated by reference 55.

In the hybrid vehicle 1 in the present embodiment, three drive modes are available to be switched depending on the engagement/release states of first, second clutches 15, 25.

The first drive mode is an electric motor drive mode (hereinafter called "EV mode"), which is achieved by releasing the first clutch 15 and engaging second clutch 25 such that vehicle is propelled by the motor/generator 20 as sole power source for driving the vehicle.

The second drive mode is an engine-employing drive mode or a hybrid drive mode (hereinafter called "HEV mode"), which is achieved by engaging both the first clutch 15 and second clutch 25 such that the vehicle travels by engine 10 in addition to motor/generator 20 as power source.

The third drive mode pertains to a slip drive mode (hereinafter called "WSC drive mode") which is achieved by maintaining second clutch 25 in a slipped state and vehicle is propelled by at least one of engine 1 and motor/generator 20 as power source. This WSC drive mode is in place to achieve a creep travel especially when the SOC (the amount of charge, State of Charge) is low, at a low temperature of cooling water of engine and the like.

Note that, in a transitional state from EV mode to HEV mode, the first clutch that has been released is engaged, and engine 10 will be started by using torque of motor/generator 20.

Moreover, the HEV mode further includes an "engine drive mode", a "motor assist drive mode", and a "power generating travel mode".

In the "engine drive mode", the engine 10 serves as the sole power source for propelling the drive wheels 54. In the "motor assist drive mode", both the engine 10 and the motor/generator 20 serve as power sources for propelling the drive wheels 54. In the "power generating travel mode", the engine 10 drives the drive wheels 54 while the motor/generator 20 functions as an electric generator Note that, in addition to the modes described above, a power generation mode may be eventually available in a vehicle stopped state where motor/generator 20 is allowed to function as generator by making use of power of engine 10 to charge battery 30 or supplying power to electric equipment.

The control system of the hybrid vehicle 1 in the present embodiment is provided with a unified or integrated control unit 60, engine control unit 70, motor control unit 80, and transmission control unit 90 as shown in FIG. 1. These control units 60, 70, 80, and 90 are interconnected to each other through a CAN communication line, for example.

The engine control unit 70 outputs, in accordance with a target engine torque command tTe from the unified control unit 60, a command controlling an engine operation point (engine rotation speed Ne, engine torque Te) to a throttle valve actuator, injector, spark plug and the like provided with engine 10. The information about engine rotation speed Ne, engine torque Te, is supplied to the unified control unit 60 through CAN communication line.

The motor control unit 80 is configured to receive information from the motor rotation sensor 21 equipped on motor/generator 20, and, in accordance with command such as a target mortar/generator torque tTm, outputs a command controlling the operation point of motor/generator 20 (motor rotation speed Nm, motor torque Tm) to inverter 35.

The motor control unit 80 is configured to calculate and manage the state of charge (SOC) of the battery 30 based on the current value and voltage detected by current/voltage sensor 31. This battery SOC information is used for control information of motor/generator 20, and sent to unified control unit 60 via CAN communication line.

The transmission control unit 90 receives sensor information from accelerator opening sensor 91 and vehicle speed sensor 92, and, in accordance with the second clutch control command from the unified control unit 60, outputs to hydraulic unit 26 a command to selectively engage and disengage the second clutch 25. Note that the information about the accelerator opening AP0 and the vehicle speed VSP are transmitted to unified control unit 60 via the CAN communication line.

The unified or integrated control unit 60 bears the function of driving or operating the hybrid vehicle 1 efficiently by controlling the operation point of the power train consisting engine 10, motor/generator 20, automatic transmission 40, first clutch 15, and second clutch 25.

The unified control unit 60 calculates the operation point of the power train based on the information from each sensor acquired through CAN communication, and executes to control the operation of the engine by the control command to the engine control unit 70, the operation of the motor/generator 20 by control command to motor control unit 80, operation of automatic transmission 40 through control command to automatic transmission 40, engagement/release operation of first clutch 15 by the control command to hydraulic unit 16 of first clutch 15, and engagement/release operation of second clutch 25 by the control command to hydraulic unit 26 of second clutch 25.

Figure 6:
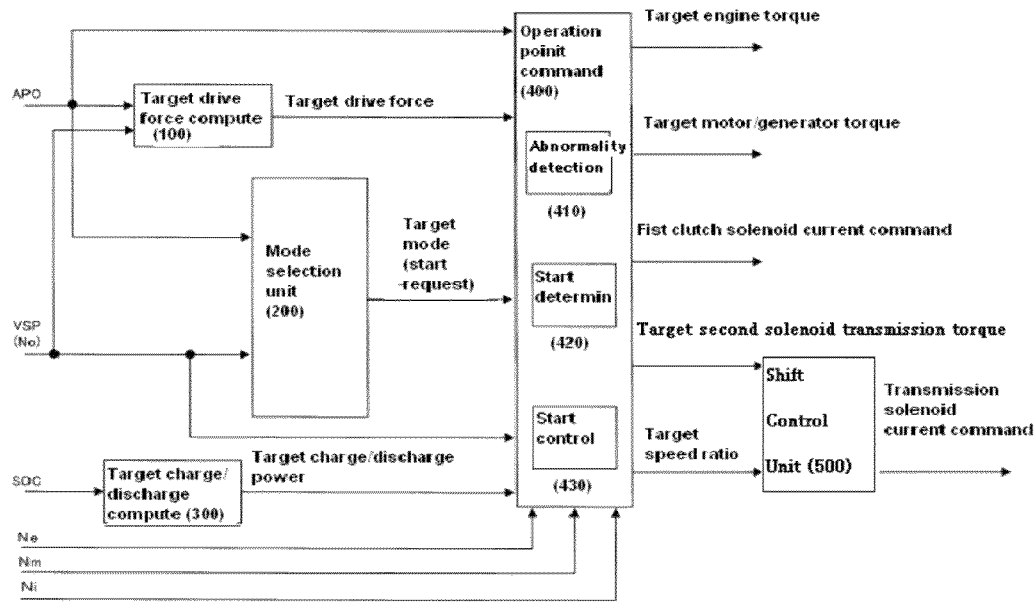
FIG. 6 is a control block diagram of a unified control unit in the embodiment according to the present invention.

Now, the control will be described which is executed by the unified control unit 60. FIG. 6 is a control block diagram of the unified control unit 60. The control described below is performed for every 10 msec, for example.

The unified control unit 60 includes, as shown in FIG. 6, a target drive force computing section 100, a mode selecting section 200, a target charge/discharge computing section 300, an operation point command section 400, and a shift control section 500.

Figure 7:
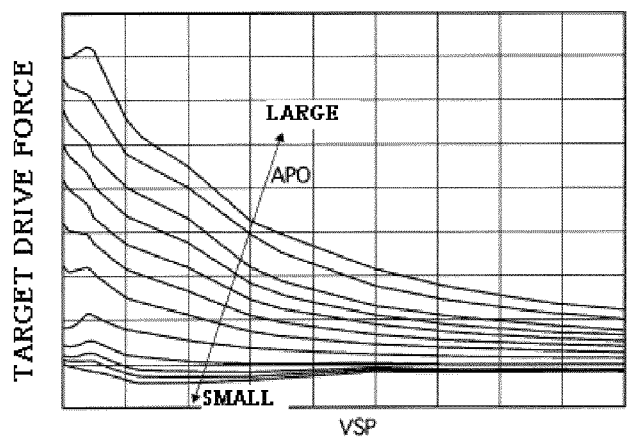
FIG. 7 is a diagram showing an example of target drive torque map in the embodiment according to the present invention

The target driving force computing section 100 is configured to use the target driving force or torque map to compute a target driving force tFo0 based on the accelerator pedal opening APO detected by accelerator opening sensor 91 and the vehicle speed VSP detected by vehicle speed sensor 92. An example of the target drive force map is shown in FIG. 7.

Figure 8:
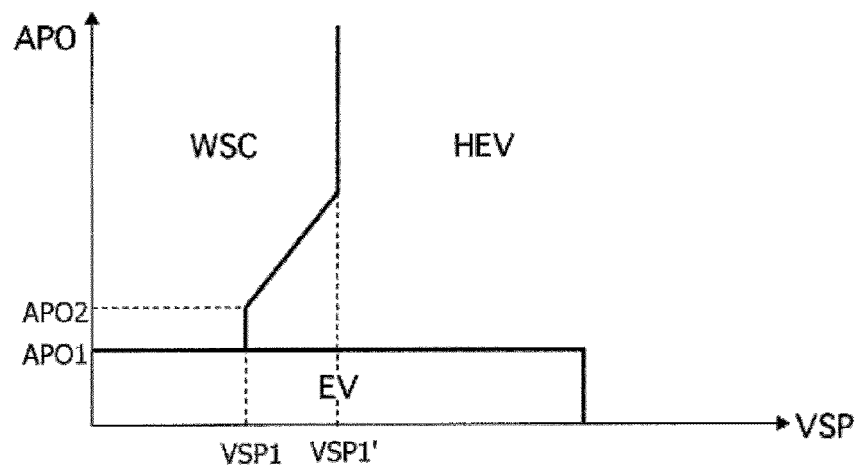
FIG. 8 is a diagram showing an example of mode map in the embodiment according to the present invention.

The mode selecting section is configured to refer to a preset mode map to select a target mode. An example of mode map is shown in FIG. 8. In the mode map of FIG. 8, based on vehicle speed VSP and accelerator opening AP0, the regions of EV drive mode, WSC drive mode, and HEV drive mode are respectively defined.

On this mode map, the switching or transition line from EV drive mode to HEV drive mode is defined by a first opening or opening degree AP01. This first opening degree AP01 is used as a determinative value for release of inhibition of start of engine 10 or determination value for allowing engine 10 to start as described below in an engine start control process.

In addition, on the mode map, the switching line from EV drive mode or HEV drive mode to WSC drive mode is defined in such a way that, in a region below a second opening or opening degree AP02, a vehicle speed region lower than a lower limit vehicle speed VSP1 corresponding to the idling rotation speed of engine at automatic transmission 40 being in a first speed ratio.

In addition, in a region above a second opening degree AP02, since a larger driving torque is needed, WSC drive mode is extended to a VSP1' region higher than the lower limit vehicle speed VSP1.

Figure 9:
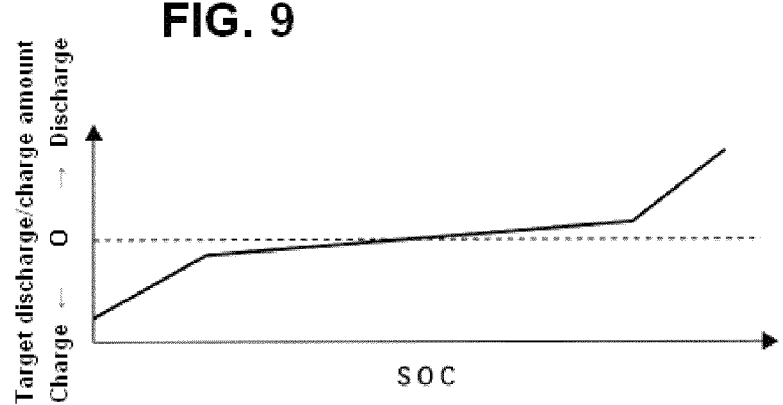
FIG. 9 is a diagram showing an example of a target charge/discharge amount map in the embodiment according to the present invention.

The target charge/discharge computing section 300 is configured to use the target charge/discharge map previously set such as one shown in FIG. 9 to compute a target charge/discharge power tP based on the battery SOC.

The operation point command section 400 is configured to compute a transitional target engine torque tTe, a transitional target motor/generator torque tTm (or target motor/generator rotation speed tNm), a transitional target first clutch transmission torque capacity tTc1, a transitional target second clutch transmission torque capacity tTc2, and a transitional target gear (gear ratio) of the automatic transmission 40, respectively based on the accelerator pedal opening APO, the target driving force tFo0, the target mode, the vehicle speed VSP, and the target charge/discharge power tP.

The target engine torque tTe is sent from unified control unit 60 to engine control unit 70, while the target motor/generator torque tTm (or target motor/generator rotation speed Nm) is sent from unified control unit 60 to motor control unit 80.

On the other hand, with respect to the target first clutch transmission torque capacity tTc1, unified control unit 60 supplies a solenoid current to hydraulic units 16 corresponding to the target first clutch transmission torque capacity tTc1.

The shift control section 500 is configured to control the solenoid valves inside the automatic transmission 40 such that the target gear step can be achieved. Note that a shift map assigns a target gear ratio based on the vehicle speed VSP and the accelerator pedal opening APO.

Further, in the present embodiment, as shown in FIG. 6, the operation point command section 400 is provided with an abnormality or failure detection section 410, start determination section 420 and start control unit 430.

The abnormality detection section or unit 410 detects abnormality in engine 10, first clutch 16 or automatic transmission 40. Note that the abnormality detection section 410 is configured to detect at least one of the abnormalities associated with engine 10, first clutch 15 and automatic transmission 40. Stated another way, the abnormality detection section 410 may be configured to detect with respect to one of engine 10, first clutch 15 and automatic transmission 40. Alternatively, the abnormality detection section is configured to detect abnormalities with respect to all of the engine 10, first clutch 15, and automatic transmission 40.

The abnormality of engine 10, first clutch 15 and automatic transmission 40 may include, in addition to the situation in which a normal operation is not available due to the failure or malfunctioning of engine 10, first clutch 15, and automatic transmission 40 per se, a situation of failure occurring with a control unit to control engine 10, first clutch 15, and automatic transmission 40 along with a situation in which a normal operation of engine 10, first clutch 15, and automatic transmission 40 are not available in order to protect one or more of these components.

As an example of abnormality with respect to engine 10, such a state may be exemplified in which, due to half-mating of connecter or disconnection and the like, information containing the ID of engine control unit 70 is interrupted in the communications between respective control units 70, 80, and 90 and unified control unit 60. In this case, because of inability to establish communication between the engine control unit 70 and unified control unit 60 and to allow engine 10 to start, abnormality detection section 410 determines that abnormality is occurring with engine 10.

On the other hand, from this state, when half fitting of the connector or disconnection of line is eliminated, and the information containing the ID of engine control unit 70 has been restored in the communications between respective control units 70, 80, and 90 and unified control unit 60, since a state that allows communication between the engine control unit 70 and unified control unit 60 and to allow engine 10 to start is resumed, the abnormality detection section 410 determines that the abnormality of the engine 10 has been resolved.

As one example of the abnormality on the first clutch 15, such a situation is illustrated in which torque cannot be normally transmitted due to the wear of the clutch plate. In this case, the engagement of the first clutch 15 is prohibited compulsorily to protect the first clutch 15, thus engine 10 cannot be started. Therefore, abnormality detection section 410 determines that abnormality is occurring with first clutch 15. This abnormality may be detected by comparing the difference in rotation speed across the first clutch 16 (i.e. engine rotation speed Ne−motor rotation speed Nm) with a predetermined value.

In addition, as an example of the abnormality relating to the automatic transmission 40, a case can be exemplified in which a speed ratio or transmission step is selected which is lower than a prescribed transmission step. In this case, since a sufficient rotation speed is not available to allow engine 10 to start, engine 10 may not be started. Therefore, the abnormality detection section 410 determines that abnormality is occurring with automatic transmission 40. The abnormality such as this is detectable by a diagnosis program executed by transmission control unit 9.

The start determination section or unit 420 determines whether or not to allow engine 10 to start based on the accelerator pedal opening AP0 when the abnormality detection section determines that abnormality of engine 10, first clutch 15, or automatic transmission 40 has been resolved.

The start control section or unit 430 controls to start engine 10, upon determination of start determination section 420 to allow engine 10 to start, when accelerator pedal opening AP0 or SOC of battery 30 meets prescribed conditions. More specifically, start control unit 430 controls hydraulic unit 16 in order to engage the then released first clutch 15, and transmits the torque of motor/generator 20 to engine 10 via first clutch 15. Subsequently, fuel injection and ignition command are performed to engine 10 to initiate a first combustion for engine start-up.

Figure 10:
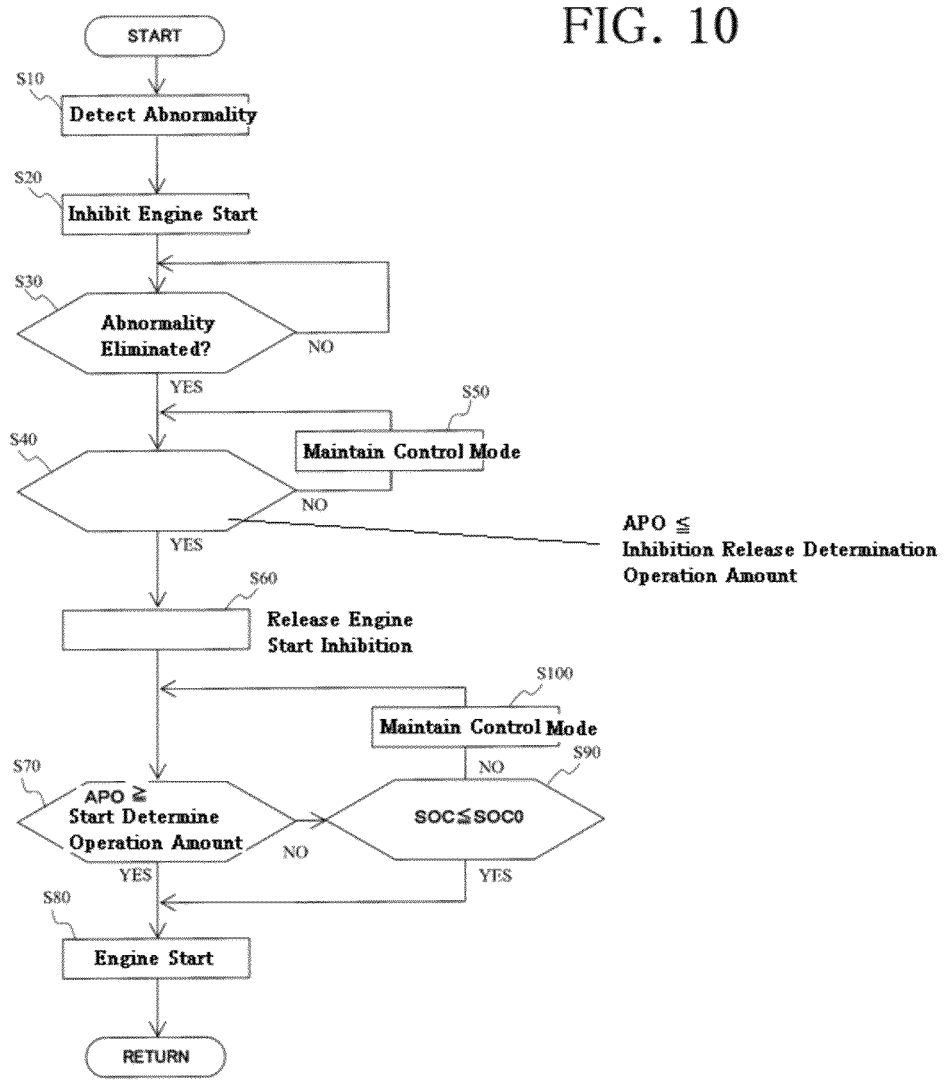
FIG. 10 is a flowchart showing an engine start control in the embodiment according to the present invention.
Figure 11:
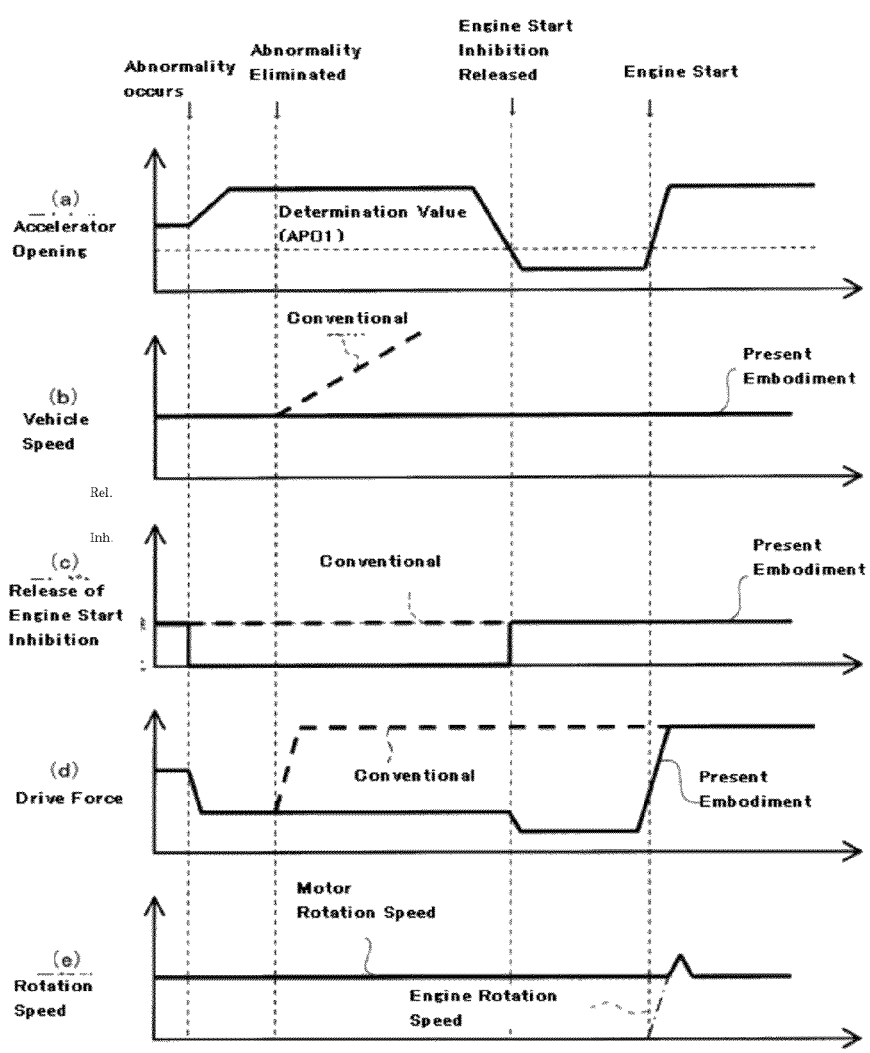
FIG. 11 is a timing chart showing a flow or process of engine start control in the embodiment according to the present invention.
Figure 12:
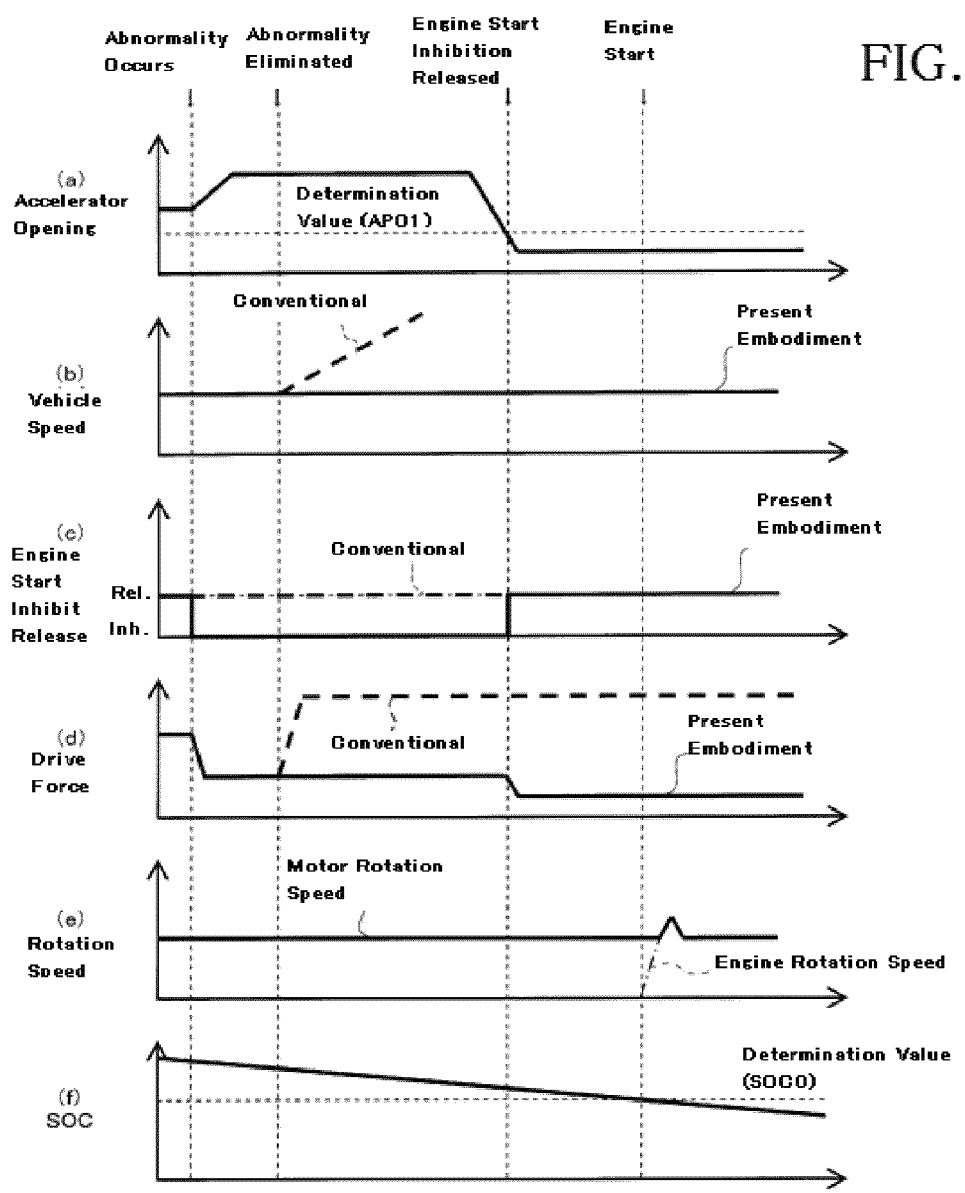
FIG. 12 is a timing chart showing another example of flow or process of engine start control in the embodiment according to the present invention.

With reference to FIG. 10 through FIG. 12 below, an engine start control for hybrid vehicle 1 in the present embodiment is described. FIG. 10 is a flowchart explaining the engine start control process in the present embodiment. FIGS. 11 and 12 show a timing chart depicting a flow of engine start control in the present embodiment.

In a state in which the HEV drive mode is being selected by the mode selecting section 200, when abnormality is detected by abnormality detection section 410 with engine 10, first clutch 15 or automatic transmission 40 (at step S10 in FIG. 10), in step S20 in FIG. 10, start determination section 420 inhibits engine 10 from starting (see FIG. 11 (c) and FIG. 12 (c)).

When abnormality occurs in the engine 10, the first clutch 15 or automatic transmission 40, the vehicle is forced to travel only by motor generator 20, the driving force will be lower than normal (FIG. 11 (d), FIG. 12 (d) so that the driver tends to depress on accelerator pedal (FIG. 11 (a) and FIG. 12 (a)).

In this state, in step S30 of FIG. 10, abnormality detection section 410 of unified control unit 60 determines whether or not the abnormality that has been detected so far is now eliminated.

Unless abnormality with engine 40, first clutch 15, and automatic transmission 40 is eliminated (No determination in step S30), abnormality detection section 410 continues to detect abnormality with engine 10, first clutch 15 and automatic transmission 40 while start determination section 420 maintains to inhibit engine 10 from starting toward start control unit 430.

On the other hand, in step S40, when abnormality detection section 410 determines that abnormality has been eliminated (YES in step S30), the start determination unit 420 then compares in step S40 the accelerator pedal opening AP0 detected by accelerator opening sensor 91 with an inhibition release determination operation amount. Note that the inhibition release determination operation amount is set to correspond to the first opening degree APO1 in the present embodiment.

As described above, as shown in FIG. 8, this first opening degree AP01 represents such an accelerator opening that separates between EV drive mode and HEV drive mode, and thus corresponds to an upper limit value in a normal EV drive mode. When the accelerator opening is greater than the first opening APO1 with engine 10 being prevented from being started, since the vehicle travels only through motor/generator 20 despite the HEV drive mode being in place, the driving torque is temporarily decreased than normal so that accelerator pedal is in a depressed state more than a degree corresponding to a normal drive force.

When the accelerator opening APO is determined greater than the first opening degree APO1 in step S40 (i.e. No in step S40), in step S50, the start determination unit 420 maintains to inhibit engine 10 from starting to start control unit 430 (start of engine 10 not allowed).

On the other hand, when it is determined that the accelerator opening APO is equal to or less than a first opening degree APO1 (YES in step S40), in step S60, the start determination section 420 releases the inhibition of the start of the engine 10 toward the start control unit 430 (see FIG. 11 (a), (c), and FIG. 12 (a), (c)).

Subsequently, in step S70, start control unit 430 compares an accelerator opening APO detected by the accelerator opening sensor 91 with a start determination operation amount. In this example, the first opening APO1 also represents this start determination operation amount.

When the accelerator opening APO is determined to be larger than the first opening degree AP01 (YES in step S70), then in step S80, the start control unit 430 controls to start engine 10 (see FIG. 11 (a) and (e)).

On the other hand, when the accelerator opening APO is determined to be less than the first opening APO1 (NO in step S70), the start control unit 430 further compares the SOC of battery 30 calculated by motor control unit 80 with a predetermined charge amount SOC0 (step S90).

In step S90, when the SOC of battery 30 is greater than the predetermined charge amount SOC0 (NO in step S90), control returns to step S70 where accelerator opening APO is compared with the first opening degree APO1.

When the SOC of the battery 30 is equal to or less than the predetermined charge amount SOC0 In step S90 (YES in step S90), in step S80, the start control unit 430 starts engine 10 (see FIG. 12 (e) and (f)).

In the case in which the accelerator opening APO is greater than the first opening degree APO1, when engine 10 would be started, the drive would be given a sense of incongruity as if a great driving force would have been suddenly imparted (see the dotted lines in FIG. 11 (d) and FIG. 12 (d)).

On the other hand, in the present embodiment, when the accelerator opening APO is larger than the first opening, i.e. opening degree APO1, even when the abnormality of engine 10, first clutch 15 or the automatic transmission 40 has been removed or eliminated, the starting of the engine 10 will be continued to be inhibited. Therefore, the engine driving force would not be resumed or imparted while the accelerator pedal is being depressed by the driver more strongly than usual so that no discomfort will be given to the driver (see solid lines in FIG. 11(d) and FIG. 12(d), respectively).

Further, in this embodiment, engine 10 will be started when the accelerator opening APO exceeds the first opening degree APO1 following release of the inhibition of engine start (i.e., in response to driver's renewed depression operation on accelerator pedal), drive torque will be resumed in accordance with the operation of the accelerator pedal by the driver without the driver having an uncomfortable feeling.

In addition, in the present embodiment, by starting the engine 10 when the SOC of the battery 30 is equal to or less than a predetermined charge amount SOC0 following release of inhibition of engine start, engine 10 may be started under the same condition as the normal use so that there is no discomfort conveyed to the driver.

Note that, the abnormality detection section 410 corresponds to one example of the abnormality detection mechanism according to the present invention, the start determination section 420 in the present embodiment corresponds to one example of the start determination mechanism according to the present invention, the start control unit 430 in the present embodiment corresponds to the start control unit according to the present invention, the first clutch 15 in the present embodiment corresponds to one example of a friction engagement element according to the present invention, the automatic transmission 40 in the present embodiment corresponds to one example of the transmission according to the present invention, the accelerator opening sensor 91 corresponds to one example of the opening detection mechanism according to the present invention, the first opening degree AOP1 in the present embodiment corresponds to one example of the predetermined opening according to the present invention, and the predetermined charge amount SOC0 in the present embodiment corresponds to one example of the predetermined charge amount according to the present invention.

The embodiments described above are descried for ease of understanding of the present invention, and thus not described to delimit the scope of the present invention. Therefore, respective elements disclosed in the embodiments are illustrated to intend to cover any design modifications or equivalents thereof which belong to the technical scope of the present invention.

The invention claimed is:

1. A control system for controlling a hybrid vehicle including an internal combustion engine and a motor/generator as a power source, a friction engagement element interposed between the internal combustion engine and the motor/generator, a transmission interposed between the power source and drive wheels, a battery subject to charge and discharge by the motor/generator, and an opening detection mechanism to detect an accelerator opening, the control system comprising:
   an abnormality detection mechanism configured to detect an abnormality of at least one of the internal combustion engine, the friction engagement element and the transmission;
   a start control unit configured to start the internal combustion engine; and
   a start determination mechanism configured to determine whether or not to allow the internal combustion engine to be started,
   to inhibit the start control unit from starting the internal combustion engine when the abnormality is detected by the abnormality detection mechanism, and
   to maintain the inhibition of the start control unit from starting the internal combustion engine when the accelerator pedal opening is larger than a predetermined opening degree even when the abnormality has been eliminated.

2. The control system of a hybrid vehicle claimed in claim 1, wherein
   the predetermined opening is set to correspond to an upper limit value of the accelerator opening in a normal, motor employing drive mode.

3. The control system of a hybrid vehicle claimed in claim 1, wherein the start determination mechanism releases the inhibition of the start control unit when the accelerator opening is equal to or less than the predetermined opening.

4. The control system of a hybrid vehicle claimed in claim 3, wherein the start determination mechanism controls the start control unit to start the engine when the accelerator opening is larger than the predetermined opening.

5. The control system of a hybrid vehicle claimed in claim 3, wherein the start determination mechanism controls the start control unit to start the engine when a charge amount of the battery detected by a charge/discharge amount detection mechanism is less than a predetermined charge amount.

6. A control method for controlling a hybrid vehicle including an internal combustion engine and a motor/generator as a power source, a friction engagement element interposed between the internal combustion engine and the motor/generator, a transmission interposed between the power source and drive wheels, a battery subject to charge and discharge by the motor/generator, and an opening detection mechanism to detect an opening of the accelerator pedal, the control method comprising:
   inhibiting the internal combustion engine from being started when an abnormality is detected with at least one of the internal combustion engine, the friction engagement element and the transmission; and
   maintaining the inhibition of the start of the internal combustion engine when the accelerator pedal opening is larger than a predetermined opening degree even when the abnormality has been eliminated.

* * * * *